Patented Oct. 30, 1928.

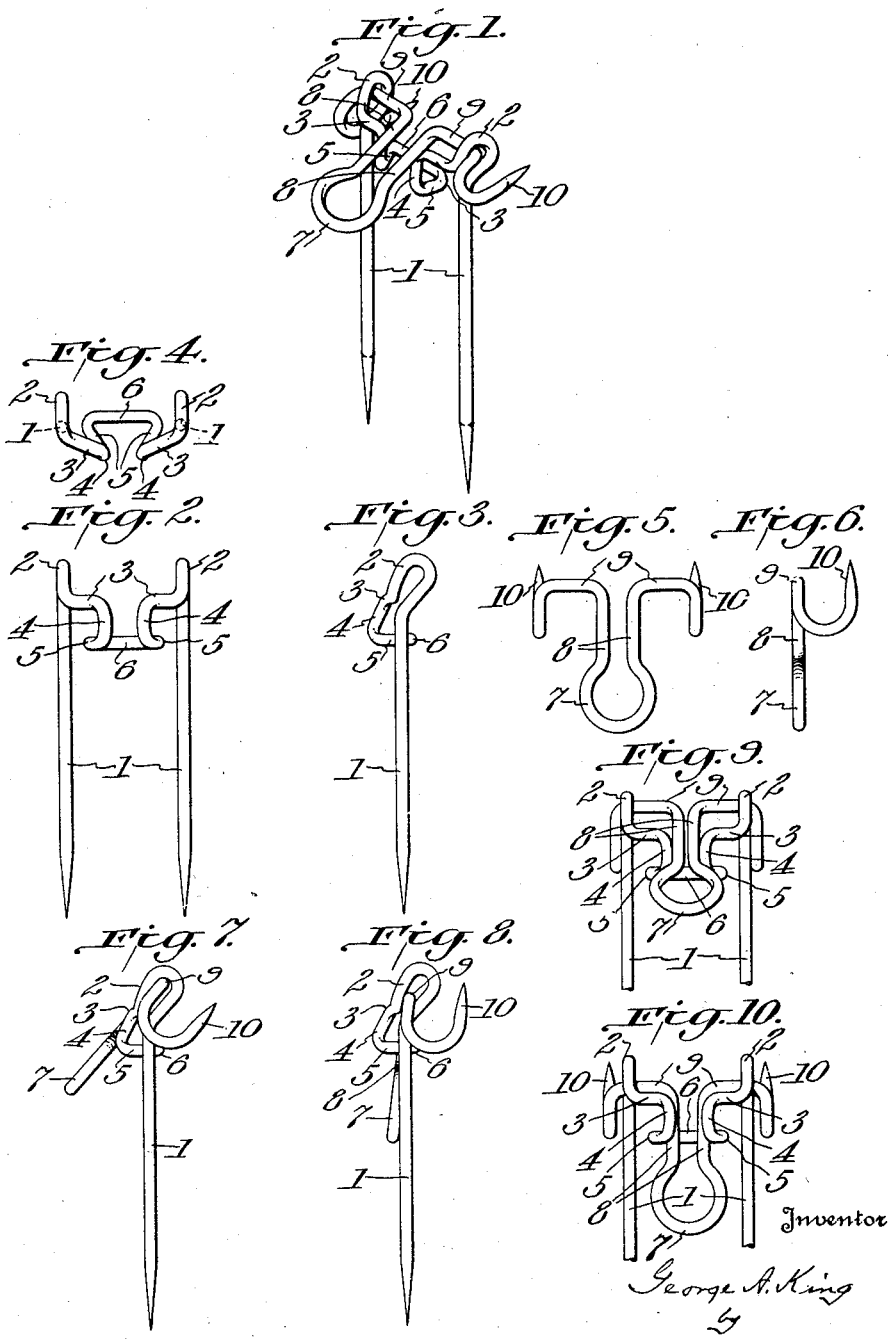

1,690,074

UNITED STATES PATENT OFFICE.

GEORGE A. KING, OF WATERBURY, CONNECTICUT, ASSIGNOR TO SCOVILL MANUFACTURING COMPANY, OF WATERBURY, CONNECTICUT, A CORPORATION OF CONNECTICUT.

ALL-WIRE-PIN FASTENER.

Application filed April 11, 1928. Serial No. 269,208.

The object of this invention is to provide a pin-mounted snap fastener member which, when in position of use, locks itself in place.

The invention is embodied in an all-wire structure, in which is used a double-pointed pin having a head bent to form an engaging device or clasp in which a snap fastener member, which is pivotally mounted in the head of the pin, is engaged by a snap action, and the snap fastener member itself has reversely extending curved prongs to engage the material in which the pin is mounted, so as to lock the pin in position, as I will proceed now to describe and finally claim.

In a pending application of George Boden and myself, filed March 8, 1928, Serial No. 260,104, owned by the owners of this present invention, is shown and described an all-wire pin, in which the snap fastener member is pivotally mounted on the head of the pin and has reversely extending curved prongs; but in the present invention the hinged snap fastener member engages a retaining element on the pin, which is not true of the other construction referred to; and the prongs in the present invention extend rearwardly on the outside of the legs of the pin instead of between the legs as in the case referred to, and are therefore more widely separated than in the invention of the other construction, with the advantage of allowing more material between them, the greater the amount of material in this respect involving the greater strength. Moreover, in the previous construction, the snap action is provided entirely by the snap fastener member, whereas in the present invention the pin legs themselves assist the snap fastener member in providing a snap action, as will more fully appear hereinafter.

In the accompanying drawings illustrating the invention, in the several figures of which like parts are similarly designated, Figure 1 is a perspective view with the snap fastener member in unlocked position. Fig. 2 is a front elevation of the pin separated from the snap fastener member; Fig. 3 is a side elevation, and Fig. 4 is a top plan view. Fig. 5 is a front elevation of the snap fastener member detached, and Fig. 6 is a side elevation thereof. Fig. 7 is a side elevation of the assembled pin and snap fastener member in the unlocked position shown in Fig. 1. Fig. 8 is a side elevation of the device with the snap fastener member in locked position. Fig. 9 is a front elevation of the parts shown in the unlocked position as in Fig. 7, the lower portions of the pin legs being broken away. Fig. 10 is a front elevation of the parts shown in the locked position as in Fig. 8, the lower portions of the pin legs being broken away.

The pin or sticking portion, has the pair of parallel pointed legs 1, united at the top by a head which is bent to form the knuckle elements 2 and the engaging device or clasp for cooperation with the snap fastener member. This engaging device has inwardly extending portions 3 approaching one another from the ends of the knuckles 2, and the downwardly extending parallel portions 4, the ends of which are bent backwardly and divergently, as at 5, and these portions connected by the cross member 6 of the pin head so as to form a clasp for resiliently engaging the snap fastener member and retaining it in closed position.

The snap fastener member is shown as a resilient socket member, comprising a loop 7 adapted to engage a complemental stud or head member of the snap fastener, and this loop is extended into the pair of parallel arms 8 rising from the loop and then bent outwardly to form the horizontal pintle members 9 which engage the knuckles 2 so as to pivot the snap fastener member in the head of the pin and permit it to be moved into and out of engagement with the clasp. The ends of the pintle members 9 are bent downwardly and then upwardly to form the rearwardly extending prongs 10, which prongs are located outside of the legs 1 and in close relation thereto, as indicated in Figs. 1 and 9, so that when the snap fastener member is turned from the unlocked position into the locked position the portions 7 and 8 will yield in order to pass into and engage the clasp and then expand to complete the engagement. Of course, a similar yielding movement of the snap fastener member mentioned, will permit the disengagement of the snap fastener member from the clasp. In the movement of the snap fastener member into engagement with the clasp, the prongs will be turned from the position shown in Figs. 1, 7 and 9 into the position shown in Figs. 8 and 10, and stick into the object on which the pin is mounted, such as the upholstered portion of an automobile seat or other part, to hold the pin in position to receive and engage the complemental snap fastener member on the detachable cover of the upholstery.

While the invention is designed primarily for use in securing detachable covers to automobiles, it is useful elsewhere.

As already stated, the prongs which pierce the material of the upholstery are more widely separated than in the prior construction, and this allows more material between them, and the greater the amount of material so engaged increases the strength of engagement.

In previous construction, the snap action is provided entirely by the snap fastener member, whereas the pin legs themselves in this present construction support and assist the snap fastener member in providing such snap action, thus ensuring the security of the locking of the snap fastener member in the clasp.

I have thus described one embodiment of my all-wire pin fastener, but wish it to be understood that variations are permissible within the principle of the invention and the scope of the claims following.

What I claim is:—

1. An all-wire pin fastener, comprising a snap fastener member and a pin member having its head formed to pivotally support said snap fastener member and to clasp it in locked position.

2. An all-wire pin fastener, comprising a double-pointed pin having a head formed with a clasp, and a snap fastener member pivotally mounted in said head and adapted to be sprung into and out of engagement with said clasp.

3. An all-wire pin fastener, comprising a pin provided with a pair of pointed legs and having a head bent downwardly and rearwardly between the pin legs and forming a clasp, and a snap fastener member pivotally mounted on the pin and adapted to be sprung into and out of engagement with the clasp.

4. An all-wire pin fastener, comprising a pin provided with a pair of pointed legs and having a head bent downwardly and rearwardly between the pin legs and forming a clasp, and a snap fastener member pivotally mounted on the pin and adapted to be sprung into and out of engagement with the clasp, said snap fastener member having rearwardly extending prongs arranged outside the legs.

5. An all-wire pin fastener, comprising a pair of pointed legs having a head bent to form knuckles and extended downwardly between the legs and bent to provide a clasp, and a resilient snap fastener member pivotally mounted in the knuckles and adapted to engage the clasp with a snap action.

6. An all-wire pin fastener, comprising a pair of pointed legs having a head bent to form knuckles and extended downwardly between the legs and bent to provide a clasp, and a resilient snap fastener member pivotally mounted in the knuckles and adapted to engage the clasp with a snap action, the resilience of the pair of legs aiding the snap action.

7. An all-wire pin fastener, provided with a pair of pointed legs having a head arranged between the legs and ending in a clasp located between the legs and below their upper ends, and a resilient snap fastener member pivoted in the head and adapted to be locked in the clasp.

8. An all-wire pin fastener, having a pair of pointed legs and a head extended downwardly between the legs, the bottom of the head being extended laterally and rearwardly to form a clasp, and a resilient snap fastener member pivotally mounted in the head and adapted to be snapped into and out of engagement with the clasp.

9. An all-wire pin fastener, having a pair of pointed legs and a head formed with knuckles and thence extended downwardly between the legs, the bottom of the head being extended laterally and rearwardly to form a clasp, and a resilient snap fastener member pivotally mounted in the head and adapted to be snapped into and out of engagement with the clasp and having rearwardly extending prongs arranged outside of the legs and adapted to be stuck into an article on which the pin is mounted.

In testimony whereof I have hereunto set my hand this 9th day of April, A. D. 1928.

GEORGE A. KING.